PARALLEL INTERROGATION OF COMPUTER MEMORIES

Filed April 4, 1960

= STORES A BINARY 0

= STORES A BINARY 1

INVENTOR
DAVID E. KEEFER

BY Cushman, Darby + Cushman
ATTORNEYS

United States Patent Office 3,155,945
Patented Nov. 3, 1964

3,155,945

PARALLEL INTERROGATION OF COMPUTER MEMORIES

David E. Keefer, Houston, Tex., assignor to Sperry Rand Corporation, New York, N.Y., a corporation of Delaware Filed Apr. 4, 1960, Ser. No. 19,833
18 Claims. (Cl. 340—174)

This invention relates generally to memory apparatus usable in digital data processing equipment, and more specifically to a novel arrangement of magnetic storage elements and their respective interrogate and sense (or output) lines whereby the contents of a complete memory can be searched to determine the presence of a particular word much more rapidly than heretofore possible, or whereby one system of notation may be translated into another system of notation.

In many applications where digital computing machines are employed to simplify the handling of large quantities of data or to solve complex technical problems, it is often desirable to locate a bit piece of data contained in a computer memory section without resorting to the time consuming method of sequentially interrogating the contents of each storage location. For example, in typical inventory control problems, it is often necessary to determine the status of a particular part or item as to quantity on hand or some other criteria. Also, large insurance companies have found that high speed electronic data processing equipment can be profitably employed to reduce the amount of time spent in keeping vast numbers of policies up to date. Using prior art search techniques in locating the particular portion of insurance policy file date would require that the information contained in each storage location of the computer memory be compared sequentially to a desired information index until equality is established. The index used may be a stock number, name, policy number, reorder print, or any other quantity peculiar to the item in question.

The present invention provides a means whereby a specific piece or group of information identified by a known identifier, or known code, but unknown in memory location can be located in the computer's memory much more rapidly than in a serial or sequential search technique.

As is well known in the digital computing art, magnetic cores having substantially rectangular hysteresis loop characteristics can be used to store binary information. A plurality of these cores are arranged in a two- or three-dimensional array or matrix, and the information content thereof is controlled by a plurality of suitably arranged drive and sense lines. The present invention teaches the use of a novel arrangement of these cores and their respective interrogate and output lines to provide a means whereby each storage location or bit position can be sensed simultaneously to determine the presence or absence of a particular piece of information.

In the preferred embodiment of this invention, two magnetic core matrices are arranged such that the information or code contained in one matrix is the 1's complement of the information or code contained in the other. Each row of each matrix is provided with an interrogate line, while each column of each matrix has an output line associated therewith. The code word being searched for is impressed via a code translator or other suitable device to the proper interrogate lines in a parallel manner. The output line associated with each column of cores storing the code being searched for will have substantially no signal induced therein. The remaining output lines, however, will carry an induced voltage. It can be seen that the absence of an output signal on a given output line indicates that the word being searched for is contained in the memory matrix in the column of cores associated with that output line, while the presence of a signal on the remaining output lines indicates the absence of the desired word in the memory.

It is, therefore, the primary object of the present invention to provide means whereby a complete memory can be searched in a parallel manner.

Another object of this invention is to provide a magnetic core memory having a parallel access feature.

Still another object of this invention is to reduce the memory search time from N memory cycles to a single memory cycle for a memory containing N registers.

Yet another object of the present invention resides in the use of a magnetic core matrix driven by both complement and true outputs of the binary coded quantity to provide at least one output line without a signal indication thereon as a discrete indication of said binary coded quantity, this indication also showing each storage location in the magnetic memory matrix of said binary coded quantity.

Another object of this invention is to provide improved means for translating one system of number notation into another.

Other objects and advantages of this invention will become obvious to those having ordinary skill in the art by reference to the following detailed description of the exemplary embodiments of the apparatus and the appended claims. The various features of the exemplary embodiments may best be understood with reference to the following drawings, wherein:

Figures 1, 2:
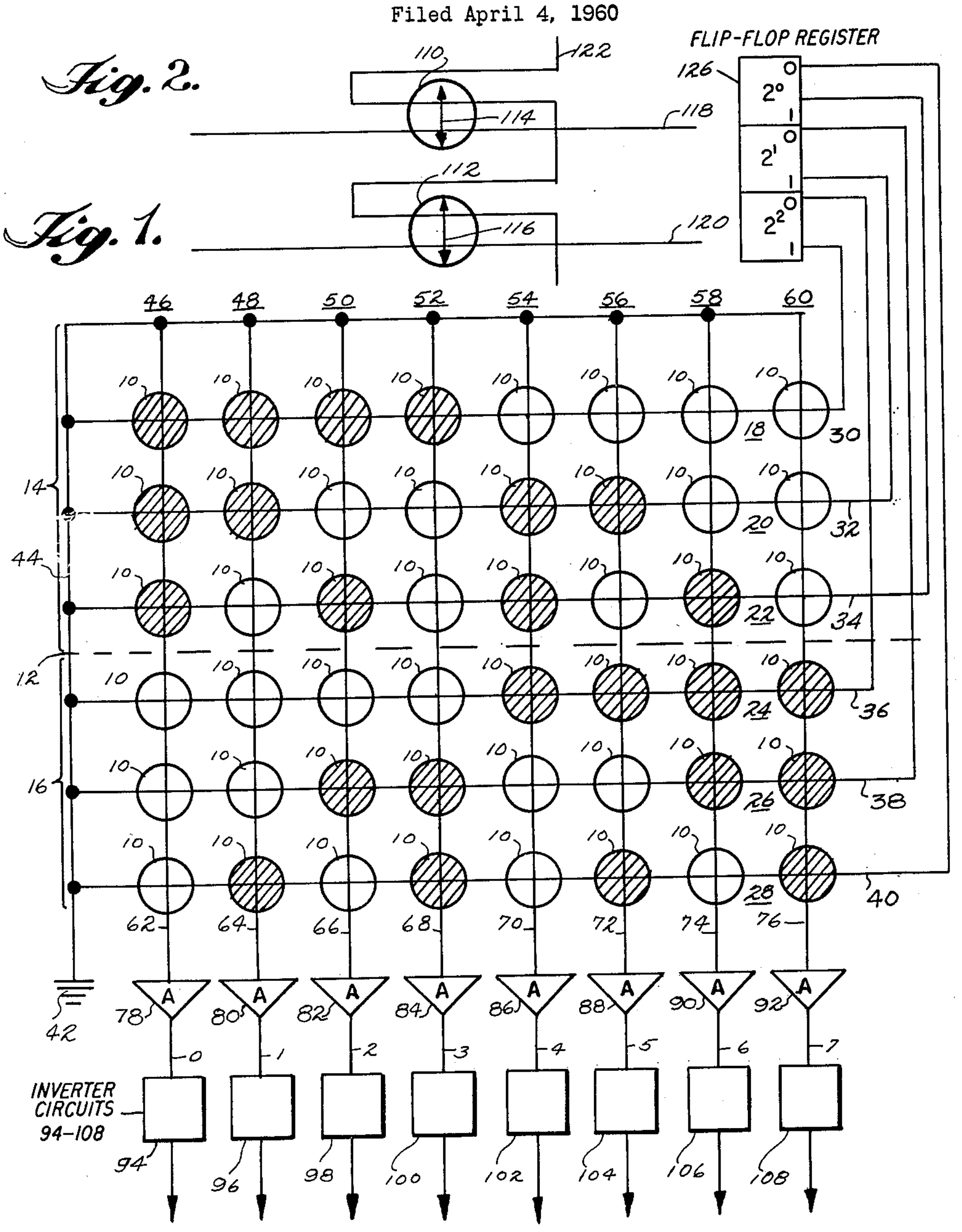
FIGURE 1 shows a schematic diagram of this invention.
FIGURE 2 shows the arrangement of drive and sense lines with respect to cores in any column when the core elements are magnetic films switched by wall motion.

In FIGURE 1 there is shown a plurality of magnetic cores 10 arranged to a two dimensional, rectangular matrix configuration. Although the array appears continuous, it should be considered either as one matrix divided into two halves by dashed line 12, or as two separate matrices 14 and 16. The cores in the upper half 14 store, in a magnetic binary sense, the 1's complement of the respective cores in the lower half 16, so that the upper half may be termed the complement portion, while the lower half 16 may be termed the true portion.

Stored in the true section 16, is a typical group of data. Those bit locations containing a binary 1, are shown cross hatched while the bit locations storing a binary 0 are left unshaded. Section 16 in this embodiment, contains eight words, each three binary digits in length. These eight words are stored one word per column in the respective columns of the lower half 16. It is important to understand that the present invention is not limited to the particular configuration shown since the size of the matrix may be expanded (or reduced) in either direction so as to include generally N words each M digits in length. By extending the concept of this invention, a three dimensional memory array may be formed wherein a parallel search operation to determine the presence or absence of a particular word is employed.

In the complement section 14 of the array is stored the 1's complement of the information contained in the true section 16. In accordance with this scheme, wherever a 0 is contained in the true section, a 1 is stored in the corresponding bit portion of the complement section, and vice versa.

Cores 10 are bistable magnetic cores, toroidal or otherwise, or thin deposited magnetic elements prepared, for example, as described in the Rubens Patent No. 2,900,282. However, any other storage element having at least two stable magnetic states may be employed without departing from the scope of the invention.

Each row of cores 18, 20, 22, 24, 26, and 28 is provided respectively with an interrogate line 30, 32, 34, 36, 38, and 40 terminated at ground 42 via bus bar 44. The inputs to these interrogate lines are supplied from what may be termed a code identifier register or translator 126. The purpose of this register, which may be composed of a plurality of conventional flip-flops, is to apply a plurality of signals, of a predetermined single polarity simultaneously one on each interrogate line pre-selected according to a known digit order, i.e., to apply the appropriate code level digit to the proper matrix interrogate line terminal. For example, the known digit order of portion 16, may be such that the most significant digit of each word is stored in row 24, the next most significant digit of each word is stored in row 26, and the least sigificant digit (in this example of words with only three digits) is stored in row 28. Similarly, in the complement portion 14, the most significant digit of the complement of each word may be stored in row 18, the next most significant digit in row 20, and the least significant digit in row 22. Thus, in a manner later explained, the most significant digit signal of the coded quantity such as $2^2$ for a three-stage binary flip-flop register will be applied to interrogate line 30 or 36, the next most significant digit signal as $2^1$ in keeping with the exemplary embodiment shown will be applied to line 32 or 38, and the least significant digit signal such as 20 will be applied to line 34 or 40. As will be later more apparent, the interrogate lines of the upper half 14 of the core matrix are respectively supplied with signals representing the 1 digits of the binary identifier or coded word being sought, while those for the lower half are supplied with the 0's digits thereof.

Respectively associated with the core columns 46, 48, 50, 52, 54, 56, 58, 60 are a plurality of sense or output lines 62, 64, 66, 68, 70, 72, 74 and 76. These lines are positioned in an inductive relationship with respect to all the cores in a particular column such that when an interrogate pulse causes one or more of the bistable magnetic elements 10 to switch from one state to another, a substantial signal is induced therein. The inductive relationship is such that the induced voltages in each output line are additive. The signals present on output lines 62–78 may be amplified to a suitable level and shaped by means of pulse amplifiers 78–92. Also, for some applications it may be desirable to include an inverter or NOT circuit in each output line such that the presence of a signal on these lines ultimately results in no signal output while the absence of a signal from an amplifier results in an output from the inverter circuit associated therewith.

In addition to the apparatus shown in FIGURE 1 there is normally provided conventional coincident current drive and inhibit lines for writing information into each magnetic core. For the sake of clarity, these lines have been omitted from the drawing, but it should be understood that a means should be provided for selectively altering the remanent state of the cores making up the matrix.

As an aid in understanding the operation of the parallel search memory of this invention, it will be assumed that the decimal digits 0 through 7, in binary code representation, are respectively stored in the true section columns of the matrix as illustrated in FIGURE 1 by the shaded and non-shaded cores. Thus, for example, the binary code 011 for the decimal digit three is stored in column 52. As a general rule, however, the information content of the memory is unknown and the problem is to determine whether a particular piece of information is actually present in the memory and where therein it is stored. It will further be assumed, arbitrarily for this example, that a binary 1 is stored in a particular cell location when the core occupying this position is in its negative remanent state, while a binary 0 is stored when the core is in its positive remanent state. Now, if all the cores 10 in the matrix are inductively coupled respectively to interrogate lines 30–40 in a direction such that a positive pulse of current applied to interrogate lines 30–40 causes the cores in a negative or 1 state to switch to positive saturation, the cores already in the positive or 0 state will produce only a small output signal in the associated output line if the cores have substantially rectangular hysteresis loops.

Assume that it is desired to search the contents of the memory matrix of FIGURE 1 for the presence of the decimal digit 3 (binary 011). To accomplish this end, only three signals, one for each binary digit, need be employed, and they may be all of the same polarity, positive in the example being explained. Remembering that only the signals for the 0 binary digits in the word being sought are applied to the proper order interrogate line in the true section 16 while signals for the 1 binary digits of the sought word are applied to the proper order interrogate lines in the complement section 14, the identifier register flip-flops 126 are set such that a positive current pulse is applied to interrogate line 36 in the lower section, and simultaneously to lines 32 and 34 in correspondence with the digits of the coded identifier being sought. The positive pulse applied to interrogate lines 36 causes all the row 24 cores that are in a 1 or negative remanent state to change state, i.e., the cores located at the intersection of row 24 and columns 54, 56, 58, and 60 assume their opposite state thereby producing a substantial output on their respective output lines 70–76. Since the cores located at the intersection of row 24 and columns 46, 48, 50 and 52 were already in the 0 or positive remanent state, only a small signal is induced in sense lines 62, 64, 66 and 68, that being due to the slight nonrectangularity of the hysteresis loop characteristics of the material.

In the same manner, the positive pulse applied to interrogate line 32 causes the cores located at the intersection of row 20 and columns 46, 48, 54, and 56 to switch from their 1 or negative remanent state to their 0 or positive remanent state. The cores located at the intersection of row 20 and columns 50, 52, 58 and 60 are already in the positive remanent state, so that the positive interrogate pulse to line 32 shifts these cores only from their positive remanent states to positive saturation. The effect of the interrogate pulse applied to line 32 is therefore to induce a relatively large voltage signal on output lines 62, 64, 70 and 72 and only a small zero or noise signal on lines 66, 68, 74 and 76.

Simultaneously, with the application of interrogate pulses to lines 36 and 32, the third interrogate pulse, which is on line 34, causes a substantial induced signal on output lines 62, 66, 70 and 74 due to the switching of the cores at the intersection of row 22 and columns 46, 50, 54, and 58 from negative to positive magnetization. The cores at the intersection of row 22 and columns 48, 52, 56, and 60 produce only a small signal on their respective output lines 64, 68, 72, and 76.

Referring back to the foregoing operational description, it can be seen that at least one core in inductive relationship with all of the output lines, except line 68, is switched. Line 68, therefore, is the only line on which no substantial signal is induced. The inverter circuits 94–108 invert the voltage signals thereby providing only from inverter circuit 100 a voltage output, indicating by virtue of the line upon which it occurs that the binary coded decimal digit 3 was stored in the memory in column 52.

In some memory matrix applications it is desirable to locate words belonging to a common class rather than just one word. Conventionally, such words are coded so that one or more digits thereof are the same, i.e., have a common identifier. By use of this invention it is possible to locate all the words so uniquely classed. With the matrix arranged as above described, and storing the same information, i.e., decimal digits 0–7, assume it is desired to locate all words having the binary digits "00" as the two most significant digits. Positive pulses are simultaneously applied to interrogate lines 36 and 38. The positive pulse on line 36 causes the cores at the intersection of row 24 and columns 54, 56, 58, and 60 to change state. The positive pulse on line 38 causes the cores located at the intersection of row 26 and columns 50, 52, 58 and 60 to change state. Thus all the output lines with the exception of lines 62 and 64 have voltages induced thereon. The inverter circuits 94–108 invert the voltage signals, providing a voltage output from inverter circuits 94 and 96 only, and indicating that the only words having "00" as their two most significant digits are stored in columns 46 and 48. These words are binary numbers 000 and 001 as shown by the shading in the drawing.

Sensing of information may alter the contents of the memories such that a means (not shown) is required to restore the information to its original condition as it existed before the sensing operation. For example, an application of the interrogate pulse in line 36 sets the cores at the intersection of row 24 and columns 54, 56, 58 and 60 to the arbitrarily defined 0 state. If the cores located at the above mentioned intersections were not restored to their initial state prior to the application of another interrogate pulse to line 36, the complement/true symmetry of the matrix would be destroyed resulting in an erroneous output from the memory. The restore step of the search cycle may be performed in any conventional manner.

As above indicated cores 10 can be toroidal or of the thin film type. When considered to be the latter, a preferred or easy axis of each film may be aligned at any angle relative to the applied interrogate field, except parallel thereto, if the sense or output line is physically perpendicular to the interrogate line as shown in FIGURE 1. In such a case, the film magnetization rotates to induce a field in the output line. For wall motion type of switching reference is made to FIGURE 2 in which there are shown two consecutive cores 110, 112 lying in the same column and respectively having easy magnetization axes 114 and 116. For simplicity and clarity only two cores and their associated lines have been shown. It is understood, however, that this is representative of a portion of an entire matrix of similar cores and associated lines such as is shown in FIGURE 1. In inductive relationship with cores 110 and 112 are interrogate lines 118 and 120. For the magnetic field caused by currents flowing through lines 118 and 120 to be effective to respectively change cores 110 and 112 to their opposite magnetic states, lines 118 and 120 may be respectively perpendicular to axes 114 and 116 though this is not a necessity. Also, in inductive relationship with cores 110 and 112 is output line 122. It is preferable for line 122 to be physically at an angle with the preferred axes 114 and 116 for the area in which inductive relationship exists. For maximum effectiveness, line 122 should be at right angles to axes 114 and 116, i.e., parallel to interrogate lines 118 and 120. The operation of the complete matrix is the same as previously described.

To eliminate the problem of restoring the memory to its original condition after each search cycle, this invention contemplates the use of non-destructive sensing techniques such as described by D. A. Buck and W. I. Frank in the January 1954 issue of the "Proceedings of the A.I.E.E.," page 825–830. For parallel search memories using toroidal ferromagnetic cores, the non-destructive sensing techniques described in the Rossing et al. application, Serial No. 645,457, filed on March 12, 1957, now abandoned may be used under certain conditions. For parallel search memories using films having an easy axis of magnetization, as the storage elements, the techniques described in the Pohm et al. application, Serial No. 691,902, now Patent No. 3,015,807 and the Pohm et al. application, Serial No. 722,584, now Patent No. 3,125,743 filed respectively on October 23, 1957, and March 19, 1958, may be used to achieve non-destructive sensing. Also contemplated for achieving non-destructive sensing in parallel search memories under certain conditions is the technique employed in the Rossing, Pohm and Rubens application, Serial No. 658,258, filed on May 10, 1957, now Patent No. 3,092,812. However, with this technique it is necessary that the easy axis of magnetization of each core be in a direction parallel to the interrogation line for that core and that the sense line therefor be at an angle preferably a 90° angle to the interrogation line as shown in FIGURE 1.

In addition to its function as a parallel search memory, the apparatus of this invention may be used as a translator of information from one system of notation to binary notation, and as a translator of information from binary notation to another system of notation (binary encoder and binary decoder respectively). As before, the core matrix is composed of two sections as shown in FIGURE 1 namely, the complement and true sections 14 and 16 respectively. The binary code is stored in the true section of the matrix while the 1's complement of the code is stored in the complement section. Pulses are then simultaneously impressed on the proper interrogate lines 30–40 corresponding to the digit-to-digit position of the code.

Considering first the apparatus of this invention functioning as a binary decoder, assume the decimal digits 0–7 are stored in the matrix as before. Then the apparatus may be used as a decimal-to-binary decoder. Further assume the binary number 101 is to be decoded, i.e., translated to a one-out-of *n* system of notation, in this case, a decimal number. No pulses are applied to interrogate lines 32, 36 and 40 while positive pulses are applied to interrogate lines 30, 38 and 34. The pulse applied to line 30 activates it causing all the row 18 cores that are in a 1 or negative remanent state to change state, i.e., the cores located at the intersection of row 18 and columns 46–52 switch states. The pulse applied to line 38 causes the cores located at the intersection of row 26 and columns 50, 52, 58 and 60 to switch states. Similarly, a pulse applied to interrogate line 34 causes the cores located at the intersection of row 22 and columns 46, 50, 54 and 58 to switch states. The remaining cores are substantially unaffected either because a positive pulse was not applied to its associated interrogate line or because the cores, if positively pulsed, were already in the remanent magnetization to which the other cores were switched. As a result a substantial voltage signal will be induced into all sense (output) lines except line 72. When these signals are inverted by means of inverter signals 94–108, an output pulse of substantial magnitude will be obtained only from inverter circuit 104. This output is representative of the decimal number 5.

When acting as a decimal-to-binary encoder, i.e., translating from a one-out-of-*n* system of notation in this case a decimal number to a binary notation system, the functions of the output and interrogate lines are reversed, i.e., a positive pulse is applied to one of the previously defined sense (or output) lines (while no pulses are applied to the others) and the output is obtained from the previously termed interrogate lines. For example, if it is desired to encode the decimal digit 4 into binary code, with the same words stored in the matrix as before mentioned, a positive pulse is applied to line 70. Accordingly, an output of substantial magnitude would be obtained from lines 36, 34, and 32. The binary code, as contained in the true portion, would therefore be 100, which is the correct result. The resulting code from the complement section 14 would be 011 which is the complement of the binary code for the decimal digit 4.

The preferred embodiment as shown in FIGURE 1 is illustrative of a two dimensional memory matrix. However, it is not intended thereby, to limit the scope of this invention to a two dimensional matrix. As before mentioned the concept of this invention may be extended to a three dimensional matrix. In so doing, FIGURE 1 may be thought of as a top view of a three dimensional matrix, i.e. as a conventional X–Z plane. Thus, columns 46–60 become word registers parallel to the Z axis and rows 18–28 become individual planes of magnetic elements. Each plane has a different interrogate line inductively coupled to all the magnetic elements in that plane. Each register has a different sense or output line inductively coupled to the magnetic elements therein. Similar connections of amplifiers and inverter circuits may be used. It is clear that the same operations as previously described apply to a three dimensional matrix.

Thus, it is apparent that there is provided by this invention a magnetic memory in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawing be interpreted as illustrative and not limitative, the scope of this invention being defined in the appended claims.

What is claimed is:

1. A circuit for comparing binary information to stored binary information comprising: a plurality of ferromagnetic anisotropic thin film elements exhibiting the capability of being nondestructively interrogated, said elements arranged in a plurality of columns and rows, each column having a different element in common with each row, said elements arranged for storing binary coded information manifestations in one-half of the elements in each column and for storing the binary complement of said information manifestations in the other half of the elements in each column, and means for determining if preselected binary coded information manifestations are stored in at least one of said columns, said means providing an indication of the column or columns in which said pre-selected coded information is stored, said determining means comprising a plurality of interrogate lines, at least one for each row of magnetic elements, a plurality of output lines, at least one magnetically coupled to all elements in each column of said elements, means for applying a plurality of signals representing pre-selected binary coded information manifestations of a single predetermined polarity to simultaneously activate ones of said interrogate lines according to the known digit order, the binary code of the pre-selected binary coded information and the predetermined polarity of plurality of signals, thereby inducing an output signal in each output line associated with a column of elements that does not contain the pre-selected information.

2. In a memory system, a first bistable magnetic core matrix having two dimensions and containing a plurality of groups of cores, a second bistable magnetic core matrix having the same number of cores and groups of cores as in said first matrix, the respective cores in the matrices being complements of each other as to magnetic state, a plurality of line pairs, each pair respectively inductively coupled to one of the different groups of cores in one of said dimensions of the first matrix and to one of the respective corresponding groups of cores of the second matrix, and a plurality of lines each of which is respectively inductively coupled to complementary groups of cores in each of said matrices in the other dimension, means for respectively setting the cores in the different core groups associated with the first plurality of lines to predetermined coded magnetic state settings so that upon receipt of given signals by one of said plurality of line pairs, the matrices provide corresponding output signals on the other plurality of output lines in accordance with the coding of the cores in both of the matrices.

3. A system as in claim 2 wherein each matrix has a like number of rows of said cores and a like number of columns of said cores, and wherein the plurality of lines respectively inductively couples the cores in corresponding columns of the matrices while the plurality of line pairs respectively inductively couples different rows of cores of the matrices.

4. A memory matrix having a plurality of bistable magnetic elements arranged in a plurality of first and second sets, each said first set having two groups of said plurality of magnetic elements, one of said groups containing the binary complement of the other of said groups, each first set having a different magnetic element in common with each second set, said memory matrix containing binary coded information stored in said first sets in a known digit order, and means for determining if pre-selected binary coded information is stored therein and the location thereof, said means comprising a plurality of interrogate lines, at least one for each second set, a plurality of output lines, at least one for each first set, means for activating said plurality of interrogate lines with a plurality of signals representing said pre-selected binary coded information and having predetermined polarities, means for placing said signals simultaneously on predetermined ones of said interrogate lines according to at least the known digit order and thereby creating an output signal in each output line associated with a first set that does not contain the pre-selected information, the arrangement being such that each first set of magnetic elements which is associated with an output line that has substantially no output signal created thereon contains the pre-selected information.

5. A memory matrix as in claim 4 wherein one-half of each first set contains binary coded information while the other half of each first set contains the binary complement thereof, said plurality of signals are of a single predetermined polarity, means for simultaneously placing said signals on predetermined ones of said interrogate lines according to the known digit order, the binary code of the pre-selected binary coded information and the predetermined polarity of the plurality of signals.

6. A memory matrix as in claim 4 wherein there is further included a different inverter circuit connected to each output line thereby producing an output voltage only from the output lines associated with each first set of magnetic elements which contains the pre-selected binary coded information.

7. Apparatus as in claim 4 wherein said bistable magnetic elements are each of the thin film type.

8. Apparatus as in claim 4 wherein each of the bistable magnetic elements is a different toroidal core.

9. A memory matrix having a plurality of bistable magnetic elements arranged in a plurality of columns and rows, each column having a different magnetic element in common with each row, said matrix arranged for storing binary coded information in one-half of the magnetic elements in each column and for storing the binary complement of said binary coded information in the other half of the magnetic elements in each column, and means for determining if pre-selected binary coded information is stored in at least one of said columns and the column or columns in which it is stored comprising a plurality of interrogate lines, at least one for each row of magnetic elements, a plurality of output lines, at least one magnetically coupled to all elements in each column of magnetic elements, said plurality of interrogate lines being activated by a plurality of signals representing said pre-selected binary coded information and of a single predetermined polarity, said signals being placed simultaneously on predetermined ones of said interrogate lines according to the known digit order, the binary code of the preselected binary coded information and the predetermined polarity of the plurality of signals, thereby inducing an output signal in each output line associated with a column of magnetic elements that does not contain the pre-selected information, the arrangement being such that each column of magnetic elements which is associated with an output line that has substantially no output signal induced thereon contains the pre-selected information.

10. A memory matrix for translation of electrical signals from one system of notation to another, comprising a plurality of bistable magnetic elements arranged in a plurality of first and second sets, each of said magnetic elements in each of said second sets storing binary data which is the complement of the binary data stored in each of the respective magnetic elements in each of said first sets, each first set having a different magnetic element in common with each second set, said memory matrix containing binary coded information stored in said first sets in a known digit order, the information stored in any first set being different from that stored in any other first set, a first plurality of lines respectively inductively coupled to all magnetic elements in different first sets of magnetic elements, a second plurality of lines respectively inductively coupled to all magnetic elements in different second sets of magnetic elements, input in one system of notation when applied to one of said pluralities of lines being effective to cause the matrix to provide on the other plurality of lines outputs in another system of notation determined in accordance with the magnetic coding of the different first sets.

11. A memory matrix as in claim 10 wherein said inputs include a plurality of binary signals corresponding digit-by-digit to information coded according to a given system of binary notation, said binary signals being effective to cause an output signal to be induced in each line of said first plurality of lines associated with a first set that does not contain identical binary coded information, the arrangement being such that the absence of a signal induced on a line of said first plurality of lines is representative of identical information according to another system of notation.

12. A memory matrix as in claim 10 wherein at least one pre-selected line of said first plurality of lines is activated by said inputs as a representation of information according to one system of notation, said pre-selected line being associated with a first set of magnetic elements which stores identical information coded according to binary notation, said activation causing output signals to be induced respectively on at least a portion of said second plurality of lines, said output signals being representative of said information according to a given system of binary notation.

13. A memory matrix as in claim 10 wherein at least one pre-selected line of said first plurality of lines is activated by said inputs as a representation of information stored according to a one-out-of-$n$ type system of notation where $n$ is the number of lines in said first plurality thereof, each pre-selected line being associated with a first set of magnetic elements which stores information coded according to binary and binary complement notation which is identical to that represented by said activation, said activation causing on at least a portion of said second plurality of lines respectively induced output signals representative of said information.

14. A signal comparator comprising: a plurality of binary information storage registers, each of said registers including bistable stages for storing in respective digit order positions signal representations of the true and complement values of predetermined coded information; a first set of signal windings, each winding of said first set commonly coupled to like digit order stages of all of said registers; a second set of signal windings, each winding of said second set commonly coupled to all stages of a different one of said registers; and signal detecting means for detecting a signal on any winding of one of said sets resulting from the application of a signal on at least one winding of the other of said sets.

15. A signal comparator comprising: a plurality of binary information storage registers, each of said registers including a first group of bistable stages for storing in respective digit order positions binary information and a second group of bistable stages for storing in corresponding respective digit order positions the complement of said information; a first set of signal windings including a first and second group, each winding of said first group of windings commonly coupled to all like digit order stages of said first group of stages and each winding of said second group of windings commonly coupled to all like digit order stages of said second group of stages; a second set of signal windings, each winding of said second set commonly coupled to all stages of a different one of said registers; and signal detecting means for detecting a signal on any winding of one of said sets of windings resulting from the application of a signal to at least one winding of the other of said sets.

16. A circuit for comparing binary information to stored binary information comprising: a plurality of binary information storage registers, each of said registers including a first group of bistable magnetic core stages for storing in respective digit order positions binary information and a second group of bistable magnetic core stages for storing the complement of said binary information in corresponding digit order positions; means for magnetically coupling a single polarity signal representation of the complement of each digit of the information being compared to the corresponding digit order position stage of all of said first group of register stages; means for magnetically coupling a same polarity signal representation of the true value of each digit of the information being compared to the corresponding digit order position stage of all of said second group of register stages; and means magnetically coupled to all stages of all of said registers for detecting a correspondence between said stored information and said information being compared.

17. In a memory system, a first bistable magnetizable core matrix having two dimensions for storing the true value of binary coded information manifestations, a second bistable magnetizable core matrix having the same number of cores as in said first matrix for storing the complement values of said binary coded information manifestations, a first plurality of lines respectively inductively coupled to different groups of cores in one of said dimensions of the first matrix and to the respective correspondiing groups of cores of the second matrix, a second plurality of lines resepectively inductively coupled to different groups of cores in each of said matrices in the other dimension, means for setting cores in the different core groups associated with the first plurality of lines to predetermined magnetized states indicative of said binary coded information and the complement thereof, and means coupled to selected lines of one of said plurality of lines for applying predetermined polarity signals to said matrices in a manner to provide corresponding output signals on selected lines in the other plurality of lines in accordance with the coding of the cores in both of the matrices.

18. A circuit for comparing binary information to stored binary information manifestations comprising: a plurality of binary information storage registers comprised of stages of anisotropic magnetic thin film elements, each of said elements exhibiting the capability of being nondestructively interrogated, each of said registers including a first group of elements for storing binary information manifestations in respective digit positions and a second group of elements for storing the complement manifestations of said binary information in corresponding digit order positions; means for magnetically coupling a single polarity signal representation of the complement of each digit of the information word being compared to the corresponding digit position stage of all of said first group of register stages; means for magnetically coupling a same polarity signal representation of the true value of each digit of the information word being compared to the corresponding digit order position stage of all of said second group of register stages; and means magnetically coupled to all stages of all of said registers for detecting a correspondence between stored information manifestations and said information word being compared.

References Cited in the file of this patent

UNITED STATES PATENTS

| | | |
|---|---|---|
| 2,512,038 | Potts | June 20, 1950 |
| 2,914,754 | Ganzhorn | Nov. 24, 1959 |
| 2,973,508 | Chadurjian | Feb. 28, 1961 |
| 3,001,178 | Buck | Sept. 19, 1961 |
| 3,031,650 | Koerner | Apr. 24, 1962 |
| 3,104,380 | Haibt | Sept. 17, 1963 |